US011645356B2

(12) United States Patent
O'Donncha et al.

(10) Patent No.: US 11,645,356 B2
(45) Date of Patent: May 9, 2023

(54) DEEP LEARNING FOR PARTIAL DIFFERENTIAL EQUATION (PDE) BASED MODELS

(71) Applicant: INTERNATIONAL BUSINESS MACHINES CORPORATION, Armonk, NY (US)

(72) Inventors: Fearghal O'Donncha, Aran Islands (IE); Philipp Haehnel, Schoeneiche (DE); Jakub Marecek, Dublin (IE); Julien Monteil, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1283 days.

(21) Appl. No.: 16/121,315

(22) Filed: Sep. 4, 2018

(65) Prior Publication Data

US 2020/0074295 A1 Mar. 5, 2020

(51) Int. Cl.
| | |
|---|---|
| *G06F 17/13* | (2006.01) |
| *G06N 3/08* | (2023.01) |
| *G06N 3/088* | (2023.01) |
| *G06V 10/764* | (2022.01) |
| *G06F 18/214* | (2023.01) |

(Continued)

(52) U.S. Cl.
CPC ............ *G06F 17/13* (2013.01); *G06F 18/214* (2023.01); *G06F 18/2413* (2023.01); *G06N 3/045* (2023.01); *G06N 3/047* (2023.01); *G06N 3/08* (2013.01); *G06N 3/088* (2013.01); *G06V 10/764* (2022.01); *G06F 2218/12* (2023.01); *G06N 3/044* (2023.01)

(58) Field of Classification Search
CPC ........ G06N 20/00; G06N 20/10; G06N 20/20; G06N 3/04; G06N 3/0445; G06N 3/0454; G06N 3/0472; G06N 3/08; G06N 3/088; G06N 3/044; G06N 3/045; G06N 3/047; G06F 17/13; G06F 18/214; G06F 18/2413; G06F 2218/12; G06K 9/00536; G06K 9/6256; G06K 9/627; G06V 10/764

See application file for complete search history.

(56) References Cited

U.S. PATENT DOCUMENTS

| 2011/0257950 A1 | 6/2011 | Kirby et al. | |
| 2018/0005343 A1* | 1/2018 | Rhoads | ..................... G06T 7/32 |

(Continued)

FOREIGN PATENT DOCUMENTS

CN 105674943 A 6/2016

OTHER PUBLICATIONS

Maziar Raissi Division of Applied Mathematics, Brown University,Providence, RI, 02912, USA "Deep Hidden Physics Models: Deep Learning of Nonlinear Partial Differential Equations" Jan. 20, 2018 (26 pages).

(Continued)

*Primary Examiner* — Shane D Woolwine
(74) *Attorney, Agent, or Firm* — Griffiths & Seaton PLLC

(57) ABSTRACT

Embodiments for deep learning for partial differential equation (PDE)-based models by a processor. A trained forecasting model and consistency constraints may be generated using a PDE-based model, a discretization of the PDE-based model, historical inputs the of the PDE-based model, and a representation of consistency constraints to generate a predictive output.

17 Claims, 9 Drawing Sheets

(51) Int. Cl.
    *G06F 18/2413*     (2023.01)
    *G06N 3/045*     (2023.01)
    *G06N 3/047*     (2023.01)
    *G06N 3/044*     (2023.01)

(56) References Cited

U.S. PATENT DOCUMENTS

2018/0189647 A1\*   7/2018   Calvo ........................ G06N 3/08
2019/0251421 A1\*   8/2019   Wang ..................... G06K 9/6271
2019/0385052 A1\* 12/2019   Bauer, Jr. ................ G06N 7/005
2021/0034978 A1\*   2/2021   Kato ........................ G06N 3/04

OTHER PUBLICATIONS

Eurico Covas and Emmanouil Benetos, Member, IEEE "Optimal Neural Network Feature Selection for Spatial-Temporal Forecasting" Apr. 30, 2018 (11 pages).

\* cited by examiner

DEEP LEARNING FOR PARTIAL DIFFERENTIAL EQUATION (PDE) BASED MODELS

BACKGROUND OF THE INVENTION

Field of the Invention

The present invention relates in general to computing systems, and more particularly, to various embodiments for deep learning for partial differential equation (PDE)-based models using a computing processor.

Description of the Related Art

Computing systems may be found in the workplace, at home, or at school. Due to the recent advancement of information technology and the growing popularity of the Internet, for example, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for deep learning for partial differential equation (PDE)-based models by one or more processors are described. In one embodiment, by way of example only, a method for deep learning for partial differential equation (PDE)-based models, again by one or more processors, is provided. Trained forecasting model and consistency constraints may be generated using a PDE-based model, a discretization of the PDE-based model, historical inputs the of the PDE-based model, and a representation of consistency constraints to generate a predictive output.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
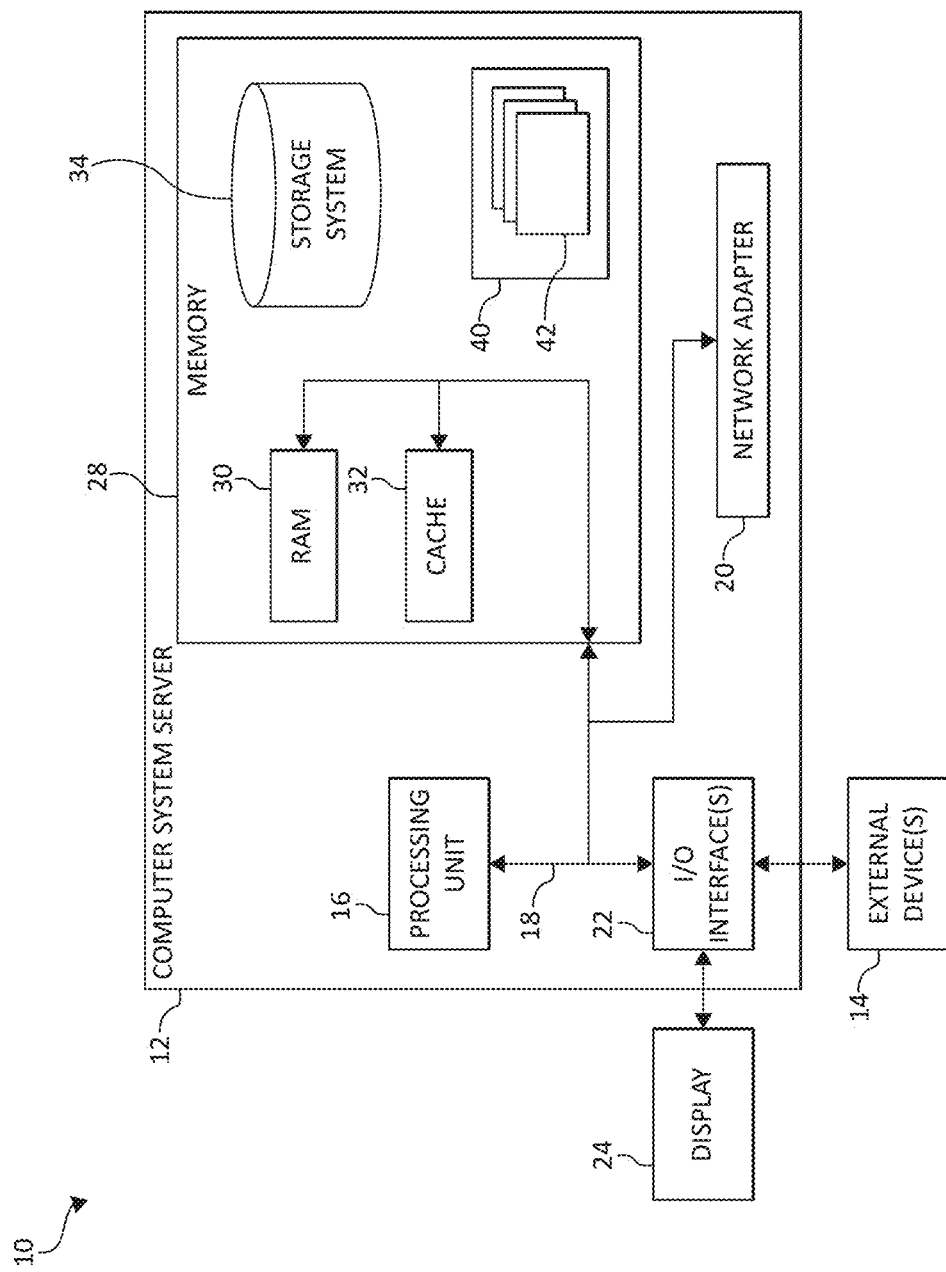
FIG. 1 is a block diagram depicting an exemplary cloud computing node according to an embodiment of the present invention.

Solving partial differential equations (PDEs) underlies much of applied mathematics, ranging from air pollution forecasting, computer graphics, oceanic engineering, and structural engineering, to and weather prediction. Conventional approaches to such prediction problems rely on numerical solvers for the PDEs and require substantial computing power in the model application phase. While in some application domains, such as structural engineering, the longer run-times may be acceptable, in domains with fast-changing inputs, such as air pollution forecasting and weather forecasting, the run-time of the solver is of paramount importance and limits the extent of the domain one could consider with a suitable resolution. As weather and air pollution data lead to complex nonlinear classification problems, in very high dimensions, naive machine-learning approaches, such as simple linear classifiers, are usually ineffective.

As weather and air pollution data, for example, lead to complex nonlinear classification problems, in very high dimensions, naive machine-learning approaches, such as simple linear classifiers, are usually ineffective. A large volume of data may facilitate the use of advanced learning algorithms such as, for example, deep artificial neural networks (ANN). Although the observation that deep-learning techniques could be applied to physical models, such as, for example, transport, weather, or pollution, the deep-learning applications did not reach the level of success observed in the field of the image classification, speech recognition, and other problems processing unstructured high-dimensional data. Thus, deep-learning techniques may be applied to physical models reducing the run-time of the model application phase, but at a cost of increasing the run-time of the model training phase.

In one aspect, deep neural networks (DNNs) may be applied to PDE-based models and use neural networks with PDE-based models in a variety of applications. A solver for PDEs may be used to obtain hundreds of thousands of outputs of a PDE solver for hundreds of thousands of inputs. The DNN may be used as means of non-linear regression between the inputs and outputs. In particular, a convolutional neural network (CNN) and long short-term memory (LSTM) units may be applied within a recurrent neural network (RNN). In a more abstract setting, the use of mesh-free DNN (e.g., deep Galerkin methods) may also be employed.

However, the applications of DNN have been limited in scale to the domains that have been tractable for the traditional solver for PDEs. For example, in pollution monitoring using machine learning, consider a coarse (0.25 degree resolution) grid of a selected area, with more than two years of air quality measurement and meteorological data, without any further insights, such as pollution sources, surface roughness, the reaction model, the multi-resolution aspects, or similar. A joint model may be analyzed and considered for feature extraction, interpolation, and prediction while employing the information pertaining to the unlabeled spatio-temporal data to improve the performance of the predictions. However, such approaches may use the measurement data without regard to the physics, which limits their performance, given the sparsity and costs of presently available sensors.

Moreover, a key issue faced by applications of deep-learning techniques to physical models is scalability. For example, it may be observed that a factor of 12,000 improvement in the speed of obtaining results comparable to that of a leading solver for the PDE, but because the model itself is utilized to train the deep-learning model, the deep-learning model does not scale beyond the domains that can be considered using a PDE-based model.

Moreover, PDE-based models are often only available for limited areas due to computational burden (e.g., Caline pollution forecasting model limited to 20 link sources and 20 receptors). Once each deep learning model is trained on the inputs of multiple meshes of the PDE-based model(s), there are no guarantees of consistency across the meshes, hence a need exists to ensure such consistency. The consistency problems inevitably arise from the different physical models used and designed for different geographic areas with a variety of data sources available (e.g., consistency across grids for air pollution, across models and grids for weather conditions, across urban as compared to highway networks such as, for example, different flux functions—for traffic conditions).

Accordingly, the present invention provides for training Deep Neural Networks (DNNs) on small domains, while applying the trained models on larger domains, with consistency constraints ensuring the solutions are physically meaningful even at the boundaries of the small domains. In this way, the present invention address the discontinuities caused by the (arbitrary or not) discretization in space of the grid where the forecasting of a model governed by a PDE is of interest. Thus, the present invention ensures boundary constraints, i.e., consistency constraints, physical viability across multiple meshes for a physical phenomenon governed by a PDE, from a deep-learning perspective.

In an additional aspect, the consistency constraints may be defined such as, for example, as the output for one (tile of a) mesh and may be used to constrain the output for another (tile of a) mesh. The consistency constraints may be applied within the training of a DNN, which allows for an increase in the extent of the spatial domain by concatenating the outputs of several PDE-based models by considering boundary conditions and state at the boundary. It should be noted that the present invention may be applied both in terms of "patching" multiple (tiles of a) meshes, and in terms of "zooming" in multi-resolution approaches, where lower resolution (e.g., city-, country-scale) component constrains higher-resolution components (e.g., district-, city-scale), which in turn impose consistency constraints on the former.

As such, a common challenge in PDE solvers is to solve the boundary value problem, which consists in imposing boundary conditions at the frontier of the region that is governed by the PDE. Such boundary conditions are additional constraints that usually come from field measurements. Ensuring that the PDEs are solved while embedding the boundary conditions is the challenge of many practical engineering applications. Throughout, there are different types of boundary problems depending on whether the function, derivative, or variable itself is known at the boundary. Boundary conditions need to be imposed to guarantee the uniqueness of the solution. In practice, such discontinuities may be either inherent to the physics itself (e.g., proper boundary conditions, different models due to different flux functions, change from a motorway traffic network to an urban traffic network, different data sources for different regions in space, etc.) or artificial (software limitations, computational time limitations, different entities providing different models).

Figure 6:
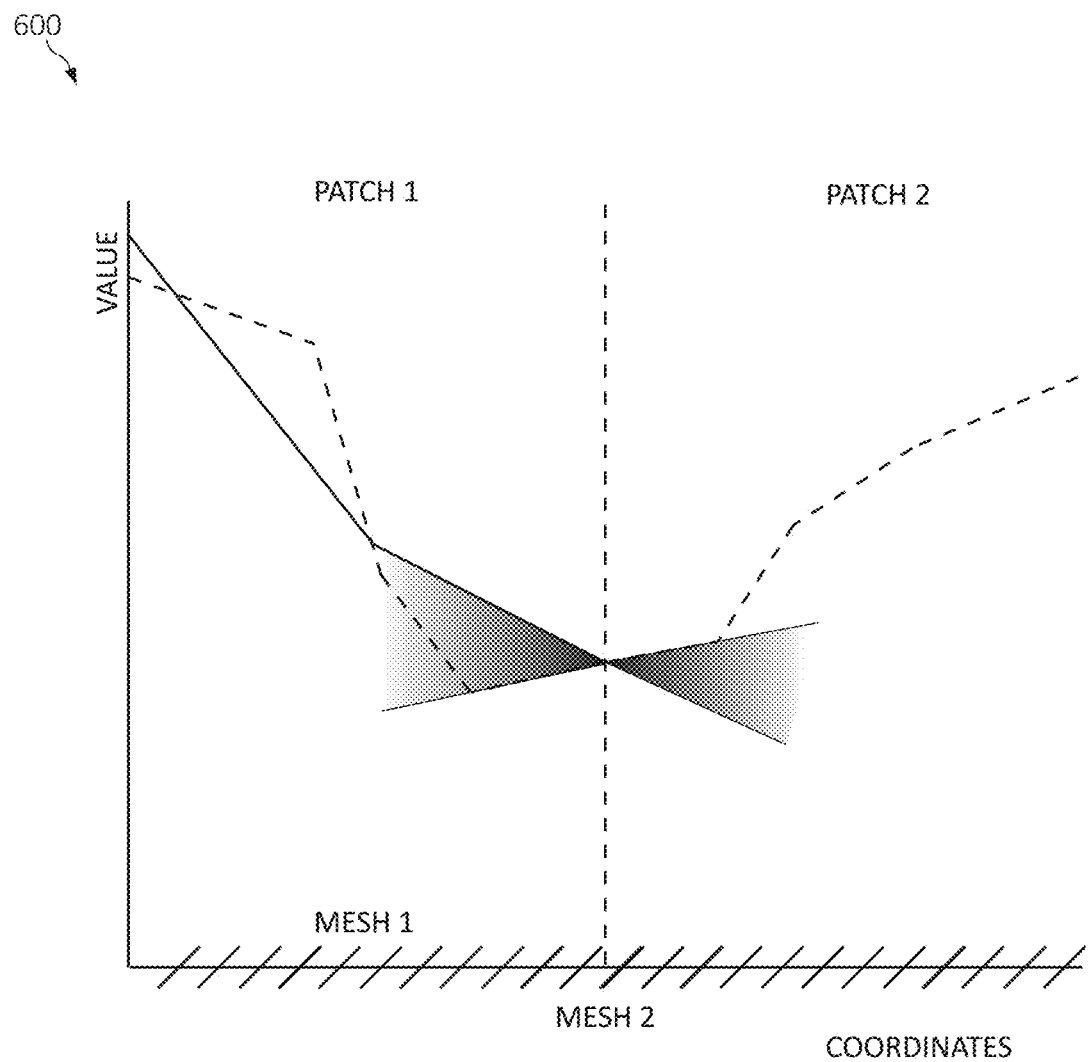
FIG. 6 is a graph depicting sub-differentials between predictions using two different meshes according to an embodiment of the present invention.
Figure 7:
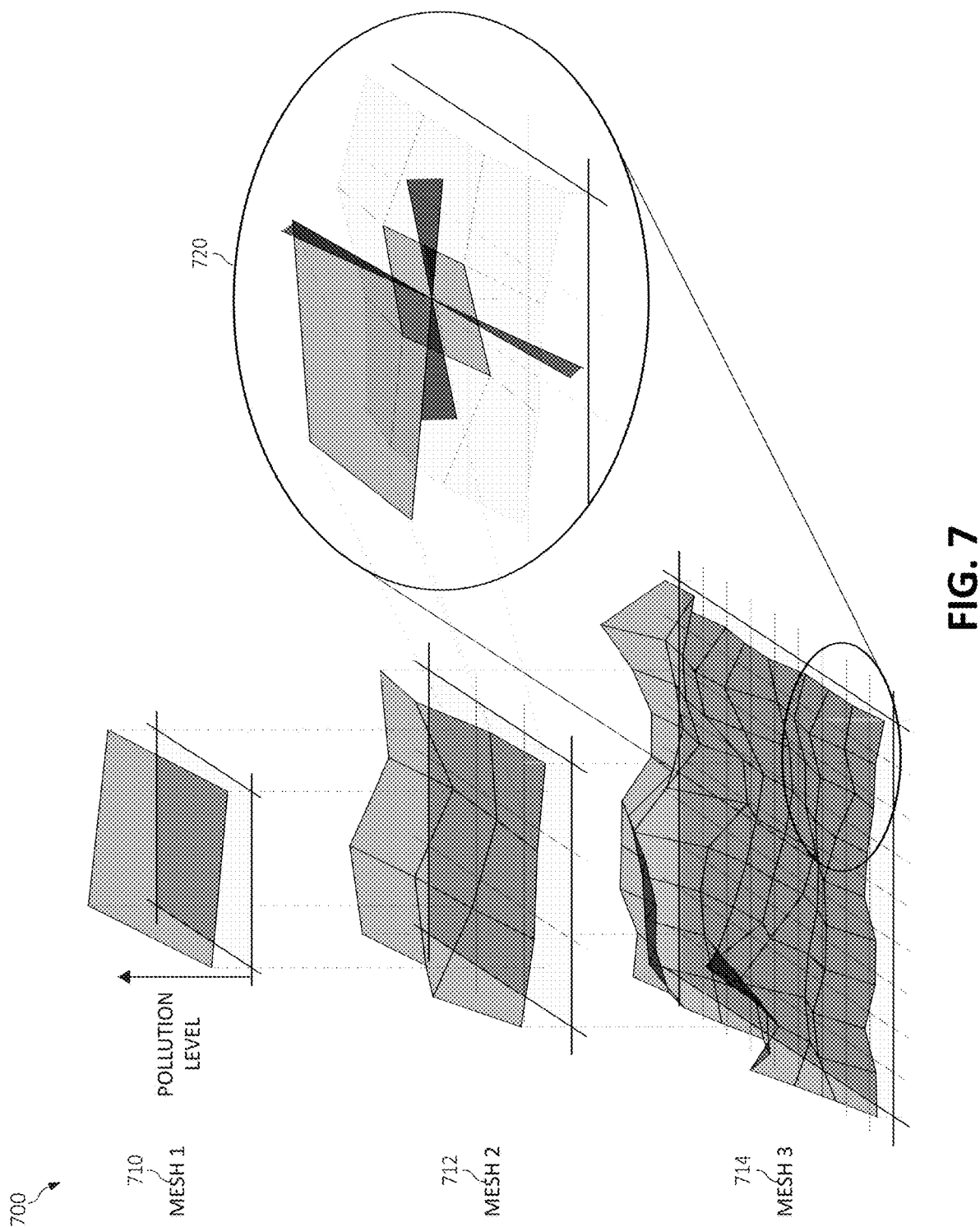
FIG. 7 is a diagram two-dimensional (2D) sub-differentials between predictions when changing the resolutions of meshes in accordance with aspects of the present invention.

Accordingly, the present invention trains a deep learning model for each available sub-grid, while ensuring consistency across sub-grids, and scaling up to a wider area such that the accuracy of the predictions is increased. The consistency constraints improve on the physicality of the predicted values from a machine learning model. Generically, the machine learning model may be trained on patches of a mesh, which spans a larger area such as, for example, as illustrated in FIGS. 6-7, below. As such, there are fewer checks in place to ensure that the overall output is physically sensible, which means smoothness of the predicted value field across patch boundaries.

As used herein, "smooth" at a point or across a line at a border of two patches means that 1) the predicted values at a point or a line for each of those patches may coincide or lay numerically close to each other, and 2) that gradients exist at all points and that their magnitude is small. In an additional aspect, "smooth" is a statement about all higher derivatives of the function as well, but only the first derivatives may be considered. Such operations may be for setting boundary conditions as consistency constraints may be used but may also be applied to 1) patching of two tiles and/or 2) changing the resolution of the mesh. In one aspect, consistency constraints can be introduced, as follows: 1) patching (across neighboring mesh tiles), 2) zooming (by changing mesh resolution), and/or 2) merging (across different PDE models) which could be seen from a constrained-backpropagation viewpoint.

In an additional aspect, the present invention provides for training a non-linear model, based on a number of input-output pairs produced by the PDE based model, where one or more of the inputs may be based on the historical data and other inputs may be suggested (in an adversarial fashion), which may be used in spatio-temporal forecasting. One embodiment may leverage techniques from Generative Adversarial Networks based learning and the DNN model is provided with inputs from both historical data and the PDE based model (e.g., a generative model). In this aspect, performance of the DNN may be improved by learning to discriminate between historical real-world data and generated data from the PDE.

In one aspect, various embodiments provided herein provide for multi-resolution adversarial training of a forecasting model and/or forecasting at multiple resolutions using the forecasting model. A trained forecasting model and consistency constraints may be generated by using as inputs: 1) consistency constraints, and 2) inputs corresponding to those of the PDE-based model. The output (e.g., the trained forecasting model and consistency constraints) are 1) the consistency constraints, and 2) outputs corresponding to those of the PDE-based model. Optionally, additional inputs may be used/consider in training forecasting model, which may be based on sensitivity. Thus, the present invention provides for generating a trained forecasting model that considers as inputs consistency constraints, and inputs corresponding to those of the PDE-based model, and has as consistency constraints and outputs similar to a PDE-based model on the output. A PDE-based model and an associated discretization ("grid" or "mesh"), historical inputs to the PDE-based model, and a numerical method/operation for translating a PDE-based model and its input to the outputs may be used for generating a trained forecasting model.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
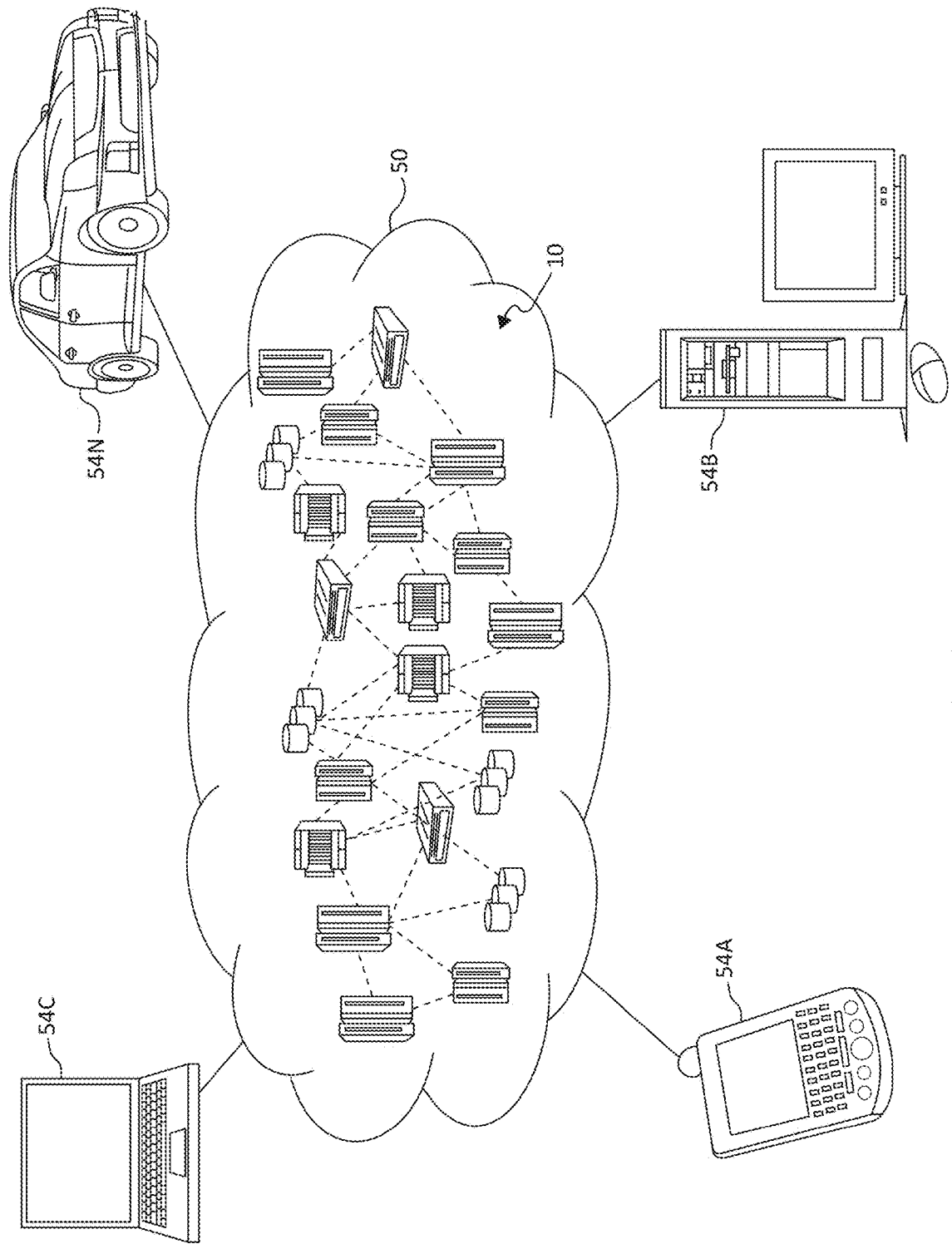
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
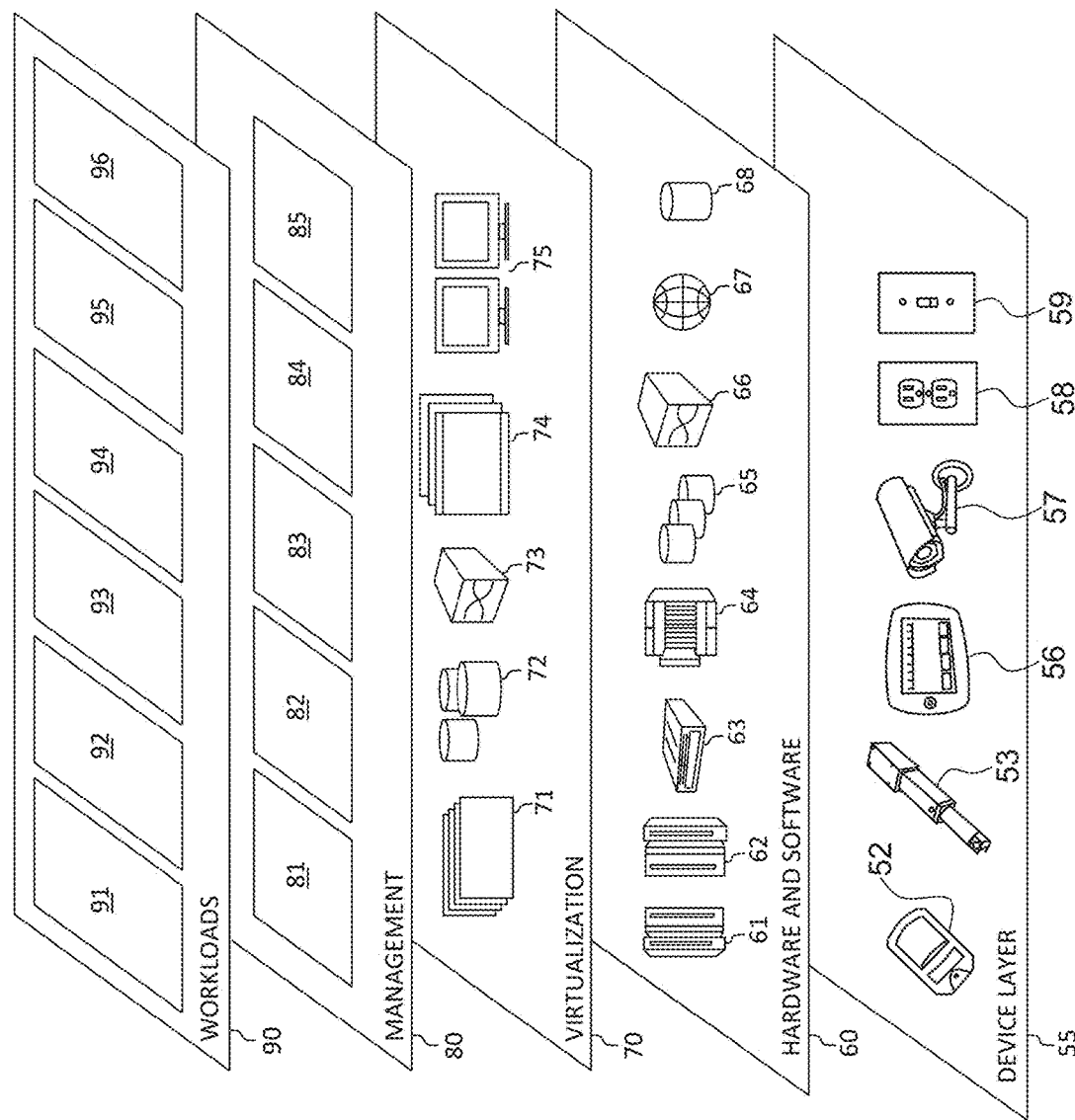
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for deep learning for partial differential equation (PDE)-based models. In addition, workloads and functions 96 for deep learning for partial differential equation (PDE)-based models may include such operations as data analysis, data collection and processing, and predictive and data analytics functions. One of ordinary skill in the art will appreciate that the workloads and functions 96 for deep learning for partial differential equation (PDE)-based models may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

As previously mentioned, the mechanisms of the illustrated embodiments provide novel approaches for deep learning for partial differential equation (PDE)-based models in a computing environment. In one aspect, a trained forecasting model and consistency constraints may be generated using a PDE-based model, a discretization of the PDE-based model, and historical inputs the of the PDE-based model.

Figure 4:
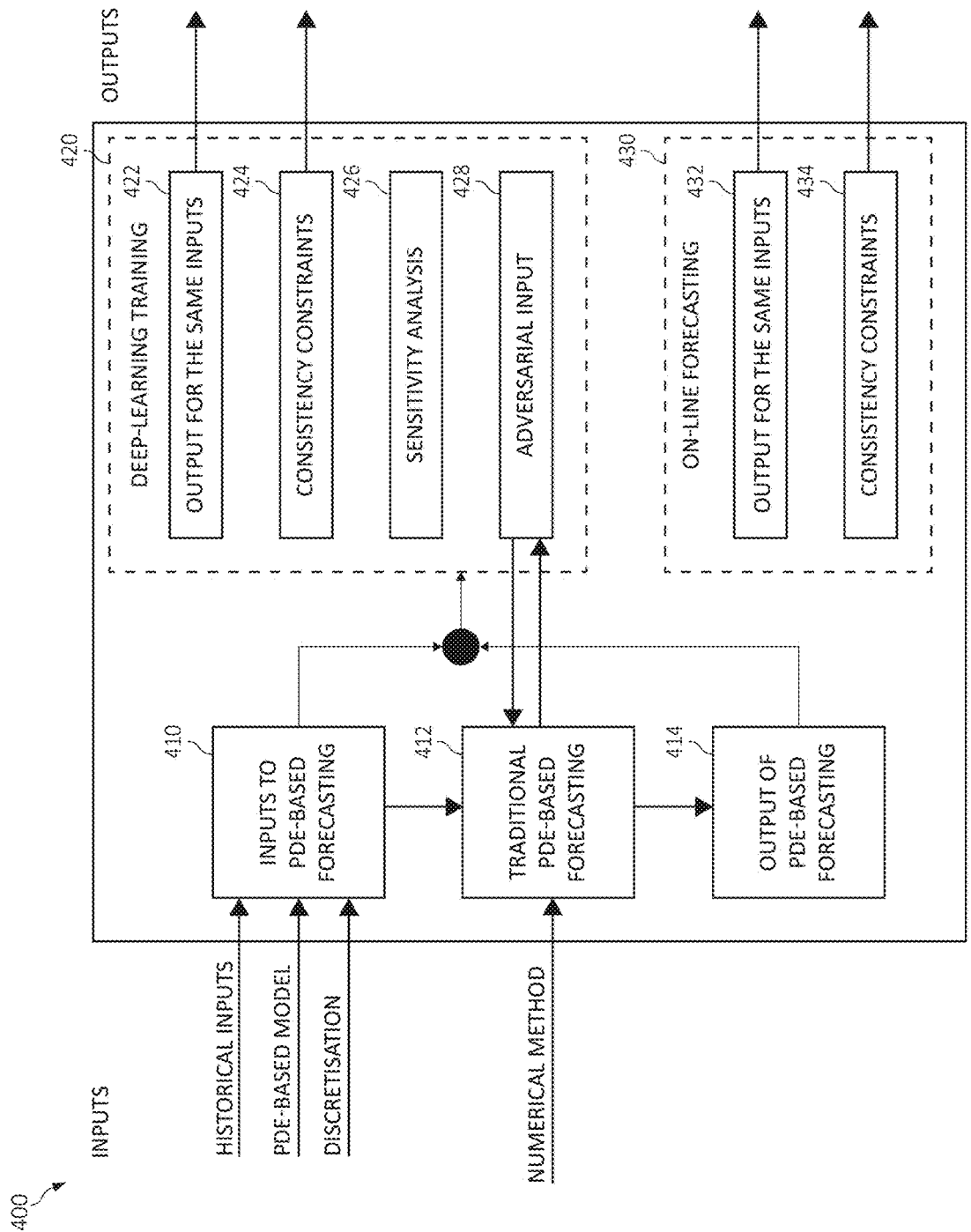
FIG. 4 is a block/flow diagram depicting deep learning for partial differential equation (PDE)-based models according to an embodiment of the present invention.

Turning now to FIG. 4, a block diagram 400 depicts deep learning PDE-based models. In one aspect, one or more of the components, modules, services, applications, and/or functions described in FIGS. 1-3 may be used in FIG. 4. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality. With the foregoing in mind, the module blocks 400 may also be incorporated into various hardware and software components of a system for deep learning PDE-based models in accordance with the present invention. Many of the functional blocks 400 may execute as background processes on various components, either in distributed computing components, or on the user device, or elsewhere.

In one aspect, a computer system for deep learning PDE-based models may, at block 410, receive input for PDE-based forecasting, at block 410, one or more inputs such as, for example, a PDE-based model, a discretization (e.g., a "grid" or "mesh") of the PDE-based model, and historical inputs the of the PDE-based model.

The PDE-based forecasting, at block 410, may analyze and process the input data. At block 412, a traditional PDE-based forecasting operation may receive the output from the PDE-based forecasting, of block 410, and use as input one or more numerical methods for translating a PDE-based model and its input to the outputs. Also, output of a PDE-based forecasting may be provided to the PDE-based forecasting component, as in block 414.

As in block 420, deep-learning training operation may be performed that may provide for PDE-based forecasting, at block 412, adversarial inputs 428 (e.g., optionally receive output from the PDE-based forecasting for the adversarial inputs 428). Additional inputs may be used/consider in training forecasting model, which may be based on sensitivity analysis (for example a statistical perturbation of inputs) 426. Consistency constraints used as input into the PDE-based forecasting, at block 410, may be the same consistency constraints 422.

At block 430, an on-line forecasting operation may be performed to generate outputs for the same inputs 432, and provide consistency constraints 434. Thus, outputs from a deep-learning training 420 operation and/or on-line forecasting may generate a trained forecasting model and consistency constraints using a PDE-based model, a discretization of the PDE-based model, and historical inputs the of the PDE-based model.

More specifically, at block 410, the input comprises a PDE-based model of a problem, for instance in some symbolic representation, a number of discretization's of a number of domains, each being for example a fixed uniform mesh (grid), and a number of inputs for each of the discretization's of each of the domains such as, for example a history of inputs used for the PDE-based model over many years.

More specifically, at block 410, the input may comprise a description of the consistency constraints, both in terms of the symbolic representation and the constants to use therein at each boundary. The symbolic representation of the consistency constraints may comprise a bound on the modulus of continuity or a bound on a norm of a subgradient, for example. The constants may be derived from uncertainty in the inputs, total variation of outputs of previous runs, or similar.

At block 412, a traditional solver for PDEs may be used to produce a number of outputs such as, for example, an instance in the form of vector fields, one for each input for each discretization of each domain, piece-wise, as in block 414.

Next, as in block 420, a non-linear regression between the inputs and outputs may be obtained such as, for example, using deep learning techniques/training such as, for example, convolutional neural networks (CNN), long short-term memory (LSTM) units within a recurrent neural network (RNN), or a combination thereof. Optionally, additional inputs may be received for training, based on sensitivity analysis of the non-linear regression, seen as an optimization problem, in the spirit of adversarial robustness (e.g., adversarial input).

With such additional inputs, the non-linear regression may be recomputed (at block 412) and continue until a certain criterion is satisfied such as, for example, upon expiration of a time limit. Eventually, the outputs may be produced, which comprise: a trained non-linear regression for the transformation of the inputs to the outputs, and consistency constraints to use by further runs of the operations on the same mesh (grid), adjacent meshes at the same resolution, overlapping meshes at a different resolution, or completely different (multi-physics) PDE-based models at adjacent or overlapping meshes.

The non-linear regression provides for each input a solution represented by values at the points of a number of discretization's of the number of domains. Typically, this solution represents a discretization of a vector field in two-dimensional ("2D"), three-dimensional ("3D"), or four-dimensional ("4D").

In an additional embodiment of FIG. 4, the input may include settings for a choice of the PDE-based models (e.g., PDE-based model at block 410) such as, for example, whether advection-diffusion or advection-diffusion-reaction is used, a number of discretizations of a number of domains such as, for example, 300 times 300 spatial domains with 20-100 line sources of pollution (e.g., road segments) each, and a number of inputs for each of the discretizations of each of the domains.

The inputs for discretization may also include traffic volume data, for example, at a discretization of the line sources (e.g., with one point at each end). The inputs for a discretization further comprise weather data at a discretization of the spatial domain (e.g., up to 10 mile grid).

As such, up to 900 floating-point values for angle of wind directions, 900 floating-point values for the speed of wind, 900 floating-point values for humidity, and 900 floating-point values for temperature, within the 300 times 300 spatial domain may be used. A history of inputs used for the PDE-based model (over a selected period of time) may be used/provided (e.g., 100,000 times the data above for each discretization).

A description of the consistency constraints, as further input, may take the form of the symbolic representation of a bound on a subgradient of the pollutant concentration, and numerical values for the bound and a number of points discretizing the boundary of each of the domains, which may be related to the error in the measurement chain used within sensor for a given pollutant.

Thus, the present invention uses a traditional solver for PDEs to produce a number of outputs, as in block 414, for instance in the form of vector fields of concentrations of each pollutant, one for each input for each discretization of each domain. Next, a non-linear regression between the inputs and outputs may be obtained, using CNN. The outputs comprise the trained non-linear regression for the transformation of the inputs to the outputs, and consistency constraints to use by further runs of the operations on the same mesh (grid), adjacent meshes at the same resolution, and overlapping meshes at a different resolution.

Figure 5:
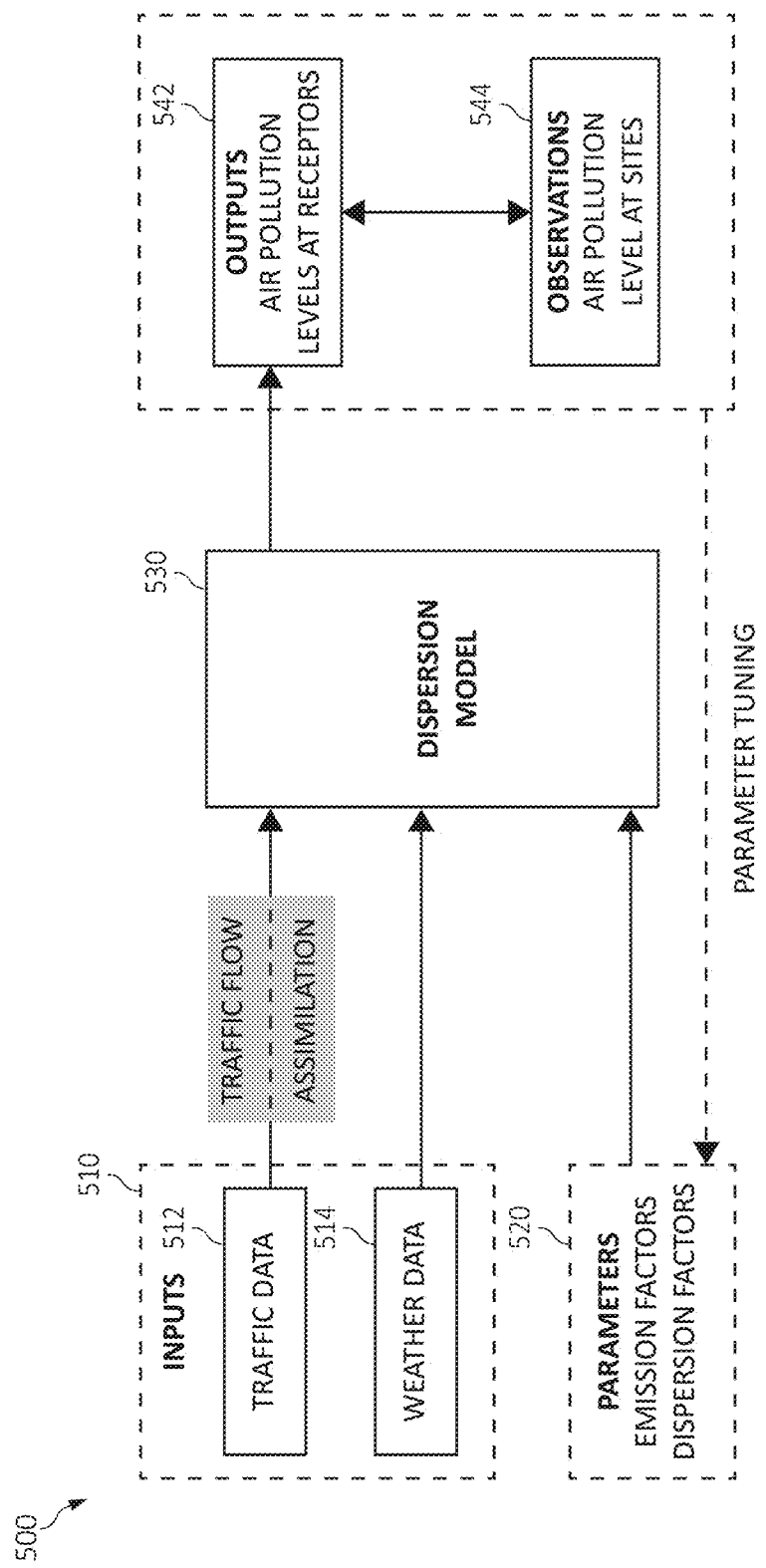
FIG. 5 is a block diagram depicting PDE-based prediction deep learning for partial differential equation (PDE)-based models in accordance with aspects of the present invention.

Turning now to FIG. 5, consider the following application of the present invention for a PDE-based air pollution prediction using deep learning for a PDE-based mode (e.g., air pollution forecasting and monitoring). Also, computer system/server 12 of FIG. 1, incorporating processing unit 16, may be used to perform various computational, data processing and other functionality of FIG. 5. Therein, the PDE-based model is based on the advection-diffusion or advection-diffusion-reaction equations.

The inputs 510 comprise of traffic volume data 512 at a discretization of a road network (e.g., with one point at each intersection). The inputs 510 may further include weather data 514 at a discretization of the spatial domain of a selected area (e.g., a city with a 10 mile grid). Additionally, other inputs may comprise details of background pollution levels. Also, additional inputs such as, for example, trajectories of vehicles and/or weather sensor readings, may be considered by data assimilation operation. Also, one or more parameters (e.g., emission factors, dispersion factors, etc.) may also be uses as input into the dispersion model 530.

Based on the inputs, the dispersion model (e.g., a PDE solver) provides outputs 542 in terms of a vector field with concentrations of each of the pollutants of interest (e.g., air pollution levels at receptors) such as, for example, carbon dioxide, Sulphur dioxide, and nitrogen oxides. The observations 544 may also be relay/sent back to block 542 and/or block 520 for parameter tuning.

In view of the foregoing, consider the following operations for deep learning for PDE-based models (e.g., a PDE-based air pollution prediction model) as illustrated in FIGS. 6-7. FIG. 6 is a graph 600 depicting sub-differentials between predictions using two different meshes and FIG. 7 is a diagram 700 of two-dimensional (2D) sub-differentials between predictions when changing the resolutions of meshes.

As illustrated in graph 600, one or more values (e.g., pollution values) may be observed on the Y-axis with the coordinates, while Patch 1 for mesh 1 is depicted and Patch 2 for mesh 2 is depicted. In one aspect, the dashed lines of graph 600 represent the computed values (by the DNN) at each selected point and the solid line represent the subdifferential computed between those selected points. The shaded areas represent the area encapsulated between different consistency constraints namely a gradient based difference between dashed lines or a subgradient (or subdifferential) based difference between solid lines.

As illustrated in graph 700, mesh 1 (e.g., mesh 710), mesh 2 (e.g., mesh 712), and mesh 3 (e.g., mesh 714) are depicted. An exploded view 720 illustrates a boundary of two patches and when changing resolution and bounds on 1) values of the levels (e.g., pollution levels), and 2) subdifferentials of the distribution (e.g., pollution distribution). That is, "bounds on" may refer to the values (e.g., values of pollution levels) and/or subdifferentials of the distribution (e.g., subdifferentials of the pollution distribution). Said differently, consistency constraints provide bounds on: 1) the values or ensures that the difference between values computed on adjacent tiles are within a selected threshold, and/or 2) the subdifferentials, which ensures that the spatial gradient or rate of change of pollution levels on adjacent tiles are within some threshold. Thus, the consistency constraints for transitions between patches may be bounds on values to ensure continuity across regions given that two neighboring patches $U_i$ and $U_j$ (where $U_i$ and $U_j$ refer to different patches and $p_i$ and $p_j$ refer to pollution levels in those patches), the values of distributions (e.g., pollution distributions) in patches $U_i$ and $U_j$ should maximally differ by a parameter $\varepsilon$, as illustrated in the following equation:

$$\forall x \in U_i \cap U_j : |p_i(x) - p_j(x)| \leq \varepsilon \quad (1).$$

The consistency constraints for transitions between patches may be bounds on subdifferentials to ensure a level of smoothness across a region such as, for example, the partial derivatives of the distributions (e.g., pollution distributions) in patches in the $k^{th}$ direction maximally differ by a parameter $\varepsilon$, as illustrated in the following equation:

$$\forall x \in U_i \cap U_j : |\partial_{x_k} p_i(x) - \partial_{x_k} p_j(x)| \leq \varepsilon \text{ and } \forall x \in U_i \cap U_j : |\nabla p_i(x) - \nabla p_j(x)| \leq \varepsilon \quad (2),$$

and at the boundaries $\partial U_i$ and $\partial U_j$, where only the left or right differential can be taken such that the left or right differentials maximally differ by a parameter $\varepsilon$, as illustrated in the following equation:

$$\forall x \in \partial U_i \cap \partial U_j : \lim_{\partial \to 0} \left| \frac{p_i(x - \partial) - p_i(x)}{\partial} - \frac{p_j(x - \partial) - p_j(x)}{\partial} \right| \leq \varepsilon. \quad (3)$$

For consistency constraints for transition between meshes of different resolutions such as, for example, transitioning from mesh 1 and mesh 2 (e.g., mesh 710 and mesh 712), the same bounds for transitioning between patches, just on distributions (e.g., pollution distributions and refers to a constraint that is enforced when the DNN is inferring pollution level at meshes of different resolutions such as, for example, increasing and/or decreasing the resolution of meshes of different resolutions) arising from different meshes such as, for example, mesh 1 and mesh 2. Because enforcing at all points across a mesh is too limiting, the bounds may be enforced at selected points such as, for example, only those points of a higher-resolution mesh 2 (e.g., mesh 712) that are close/similar to a lower-resolution mesh 1 (e.g., mesh 710). If the meshes such as, for example, mesh 1 and mesh 2 do not have points in comment at the locations of enforcement of the consistency constraints, one or more new mesh points may be added, for which the values (e.g., pollution values) may be determined through linear interpolation between the bounding points of the respective mesh tile.

Additionally, the consistency constraints for transitions between meshes may be bounds on values of the distributions (e.g., pollution distributions) using a selected mesh such as, for example, mesh 2 (e.g., mesh 712) based on the variance of the distributions (e.g., pollution distributions) for mesh 1 (e.g., mesh 710).

For both the transition between patches and the transition between higher resolution-meshes and lower-resolution meshes, each consistency condition may have its own parameter E, which may come from (e.g., received from) a sensor measurement.

For data assimilation, a machine learning model may be initially trained offline using data generated by the PDE model. Optionally, the PDE model forecasts may be improved by implementing data assimilation that ingests additional sensor data. This can be performed in two ways. 1) During forecasting using the machine learning model, when new data becomes available (e.g., from a sensor), weights (e.g., linear weights for each layer in a DNN) may be recalibrated to update the machine learning model based on latest data.

The machine learning model may be trained using the outputs from the data assimilation framework, either off-line or on-line. While theoretical guarantees for the performance of such a data assimilation framework are largely restricted by the assumption of convexity, the non-convex case may be also considered (e.g., theoretical guarantees on the performance of a filter are not provided but a parameter and state estimates may be corrected).

To further illustrate, consider the following example of air pollution-based forecasting. Air pollution is known to have significant health impacts. Typically, in cities, traffic induced pollution is measured with via the levels of nitrogen oxides (NOx) and Particulate Matter (PM). The contribution of traffic to the levels of NOx may be around 70% in various cities, for example, whereas the contribution of traffic to the levels of particulate matter pollution may be up to 50% in cities. However, deep learning has never been applied to forecast air pollution levels. As such, the present invention may be applied to forecast air pollution levels, for example, by estimating and predicting the traffic-induced air pollution levels for defined receptors across the city.

Thus, in one aspect, a DNN may be trained for city-scale pollution monitoring utilizing, for example, a three-dimensional ("3D") structure of the atmosphere from a numerical weather forecasting model comprising atmospheric data (i.e., velocities, pressures, humidity, and temperatures in 3D). Pollution measurements and traffic data may also be used, since traffic is measurable and strongly correlated to (especially NOx and PM) pollution in the cities. A given discretization of a city in multiple meshes may also be used as input for training the DNN, corresponding to multiple geographic areas with their specificities.

Figure 8:
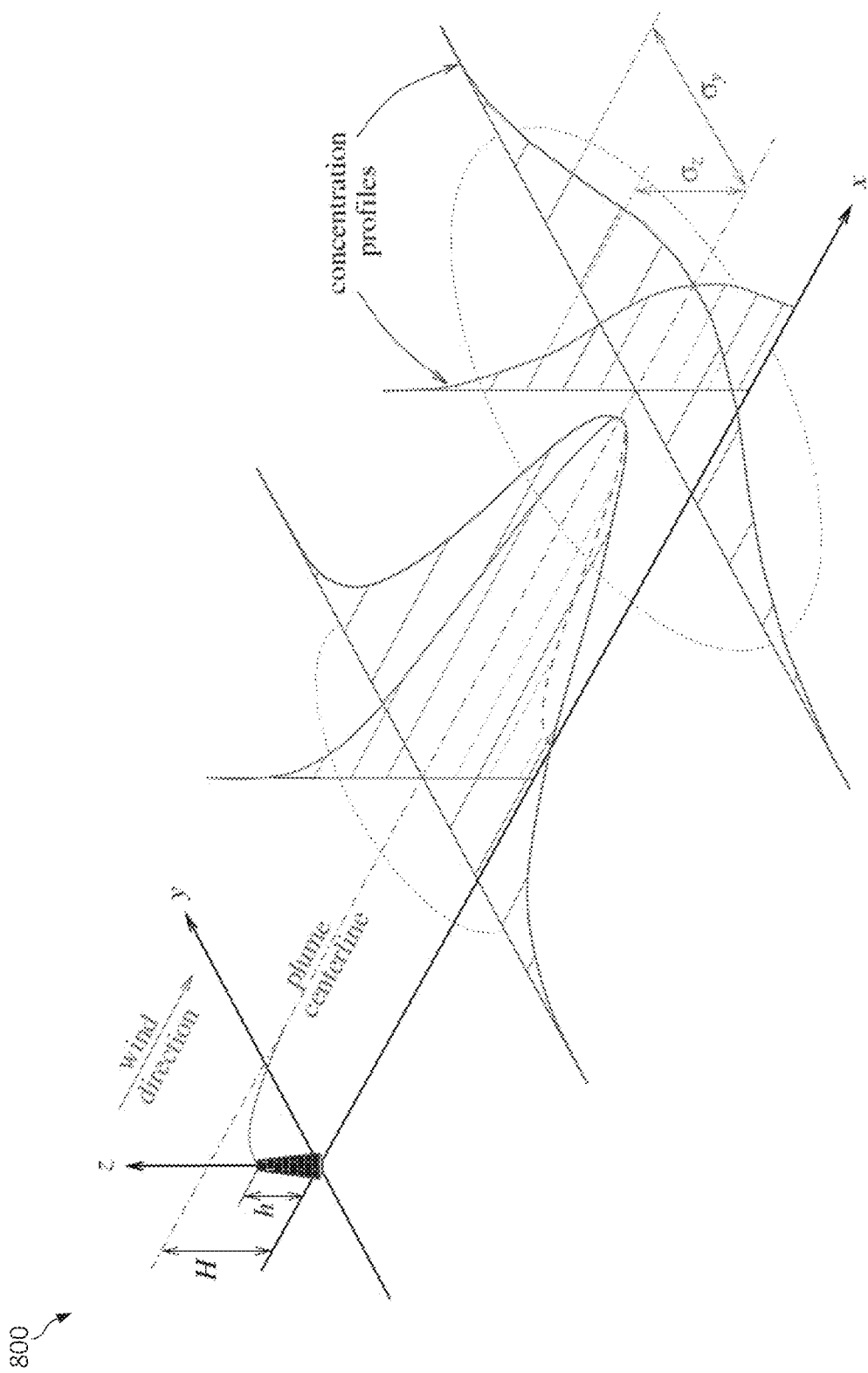
FIG. 8 is a diagram of a Gaussian Plume model for deep learning for partial differential equation (PDE)-based models in accordance with aspects of the present invention.

The data inputs may be (1) the traffic volumes at intersections, which may be used to determine the traffic volumes for a number of roadway links across the city, (2) the atmospheric data, (3) air pollution measurement sites (e.g., 9 sites across the city for PM, and 6 sites for NOx). Then the air pollution dispersion model propagates the pollution levels emitted from the roadway links. The model that may be used is a Gaussian Plume model, as illustrated in FIG. 8, and takes aggregated data as inputs (e.g., typically of one hour), which may be the model implemented in the Caline4 modelling suite (Caltrans). Such a model may be standard to describe the transport of pollutants. Each pollutant may be defined by its mass $C(\vec{x}, t)$ at a location $\vec{x}((x, y, z)$ and time t. An example of the propagation of a pollutant is given in FIG. 8, assuming a wind direction along the x axis. The pollutant is emitted from the point source, and the concentration profiles are given in the downwind directions, given the dispersion factors $\sigma_z$ and $\sigma_y$. In one aspect, the law of conservation of mass may be used as illustrated in the following equation:

$$\frac{\partial C}{\partial t} = \nabla * \vec{J} = S, \tag{4}$$

where $S(\vec{x}, t)$ is a source or sink term, and $J(\vec{x}, t)$ is the mass flux considering the effects of diffusion and advection. The equation reduces to (e.g., an advection-diffusion equations):

$$\frac{\partial C}{\partial t} = \nabla * (C\vec{u}) = \nabla(K\nabla C) + S,, \tag{5}$$

where $\vec{u}$ is the wind velocity and K is a 3×3 diagonal matrix of the space diffusion coefficients, $K_x$, $K_y$, and $K_z$.

Thus, the present invention provides for training on small domains, while applying the trained models on larger domains, with consistency constraints ensuring the solutions are physically meaningful even at the boundary of the small domains, as illustrated in the results on an air-pollution forecasting model for the city in the above example.

Figure 9:
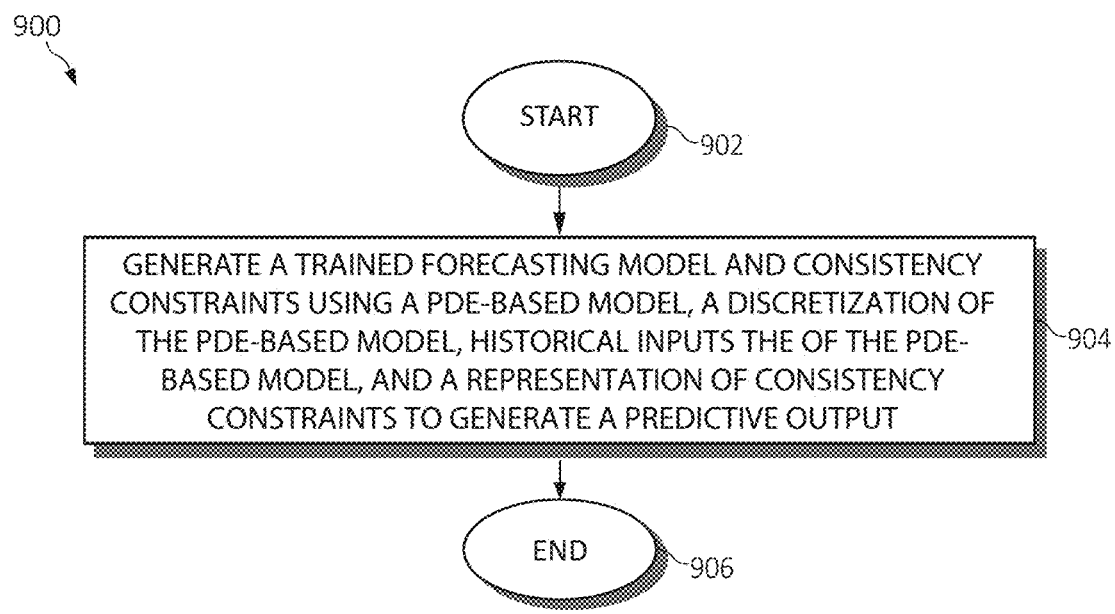
FIG. 9 is a flowchart diagram depicting an additional exemplary method for deep learning for partial differential equation (PDE)-based models by a processor; again, in which aspects of the present invention may be realized.

Turning now to FIG. 9, a method 900 for deep learning for PDE-based models by a processor is depicted, in which various aspects of the illustrated embodiments may be implemented. That is, FIG. 9 is a flowchart of an additional example method 900 for estimating substitutability between skills by combining skill similarities from one or more sources in a computing environment according to an example of the present invention. The functionality 900 may be implemented as a method executed as instructions on a machine, where the instructions are included on at least one computer readable medium or one non-transitory machine-readable storage medium. The functionality 900 may start in block 902.

A trained forecasting model and consistency constraints may be generated using a PDE-based model, a discretization of the PDE-based model, historical inputs the of the PDE-based model, and a representation of consistency constraints to generate a predictive output, as in block 904. The functionality 900 may end in block 906.

In one aspect, in conjunction with and/or as part of at least one block of FIG. 9, the operation of 900 may include one or more of each of the following. The operation of 900 may define the consistency constraints to include consistency constraints from a higher resolution PDE-based model, consistency constraints from a lower resolution PDE-based model, and consistency constraints from adjacent tiles of a similar resolution PDE-based model, and/or define the consistency constraints as actual values of bounds of the PDE-based model.

The operation of 900 define the consistency constraints as bounds on output values by the PDE-based model at selected points, and/or acquire the bounds from a measurement chain error of one or more sensor measurements. The operation of 900 may acquire the bounds from one or more sensor measurements, and/or define the bounds based on a total variance of across a patch of a mesh. The operation of 900 may define the consistency constraints as bounds on a modulus of continuity, define the consistency constraints as bounds on one or more sub-gradients, and/or define the consistency constraints as bounds on a sum of the sub-gradients across all tiles of mesh.

The operation of 900 may generate from the trained forecasting model additional inputs to use for training of additional forecasting models, apply data assimilation for training the trained forecasting model using a machine learning operation, and/or perform on-line learning at runtime using the machine learning operation for training the trained forecasting model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting, data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for deep learning for partial differential equation (PDE)-based models by a processor, comprising:
generating a trained forecasting model and consistency constraints using a PDE-based model, a discretization of the PDE-based model, historical inputs of the PDE-based model, and a representation of consistency constraints to generate a predictive output, wherein the consistency constraints include consistency constraints from a higher resolution PDE-based model, consistency constraints from a lower resolution PDE-based model, and consistency constraints from adjacent tiles of a similar resolution PDE-based model.

2. The method of claim 1, further including defining the consistency constraints as bounds on output values by the PDE-based model at selected points.

3. The method of claim 2, further including:
acquiring the bounds from a measurement chain error of one or more sensor measurements; or
defining the bounds based on a total variance of across a patch of a mesh.

4. The method of claim 1, further including:
defining the consistency constraints as bounds on a modulus of continuity;
defining the consistency constraints as bounds on one or more sub-gradients; or
defining the consistency constraints as bounds on a sum of the sub-gradients across all tiles of mesh.

5. The method of claim 1, further including generating, from the trained forecasting model, additional inputs to use for training of additional forecasting models.

6. The method of claim 1, further including:
applying data assimilation for training the trained forecasting model using a machine learning operation; or
performing on-line learning at run-time using the machine learning operation for training the trained forecasting model.

7. A system for deep learning for partial differential equation (PDE)-based models, comprising:
one or more computers with executable instructions that when executed cause the system to:
generate a trained forecasting model and consistency constraints using a PDE-based model, a discretization of the PDE-based model, historical inputs of the PDE-based model, and a representation of consistency constraints to generate a predictive output, wherein the consistency constraints include consistency constraints from a higher resolution PDE-based model, consistency constraints from a lower resolution PDE-based model, and consistency constraints from adjacent tiles of a similar resolution PDE-based model.

8. The system of claim 7, wherein the executable instructions define the consistency constraints as bounds on output values by the PDE-based model at selected points.

9. The system of claim 8, wherein the executable instructions:
acquire the bounds from a measurement chain error of one or more sensor measurements; or
defines the bounds based on a total variance of across a patch of a mesh.

10. The system of claim 7, wherein the executable instructions:
define the consistency constraints as bounds on a modulus of continuity;

define the consistency constraints as bounds on one or more sub-gradients; or define the consistency constraints as bounds on a sum of the sub-gradients across all tiles of mesh.

11. The system of claim 7, wherein the executable instructions generate, from the trained forecasting model, additional inputs to use for training of additional forecasting models.

12. The system of claim 7, wherein the executable instructions:

apply data assimilation for training the trained forecasting model using a machine learning operation; or perform on-line learning at run-time using the machine learning operation for training the trained forecasting model.

13. A computer program product for, by a processor, deep learning for partial differential equation (PDE)-based models, the computer program product comprising a non-transitory computer-readable storage medium having computer-readable program code portions stored therein, the computer-readable program code portions comprising:

an executable portion that generates a trained forecasting model and consistency constraints using a PDE-based model, a discretization of the PDE-based model, historical inputs of the PDE-based model, and a representation of consistency constraints to generate a predictive output, wherein the consistency constraints include consistency constraints from a higher resolution PDE-based model, consistency constraints from a lower resolution PDE-based model, and consistency constraints from adjacent tiles of a similar resolution PDE-based model.

14. The computer program product of claim 13, further including an executable portion that defines the consistency constraints as bounds on output values by the PDE-based model at selected points.

15. The computer program product of claim 14, further including an executable portion that:

acquires the bounds from a measurement chain error of one or more sensor measurements; or defines the bounds based on a total variance of across a patch of a mesh.

16. The computer program product of claim 13, further including an executable portion that:

defines the consistency constraints as bounds on a modulus of continuity;

defines the consistency constraints as bounds on one or more sub-gradients; or defines the consistency constraints as bounds on a sum of the sub-gradients across all tiles of mesh.

17. The computer program product of claim 13, further including an executable portion that:

generate, from the trained forecasting model, additional inputs to use for training of additional forecasting models;

apply data assimilation for training the trained forecasting model using a machine learning operation; or perform on-line learning at run-time using the machine learning operation for training the trained forecasting model.

* * * * *